Sept. 25, 1962   L. M. PUSTER   3,055,384
PNEUMATIC CONTROLLER
Filed Sept. 3, 1959   2 Sheets-Sheet 1
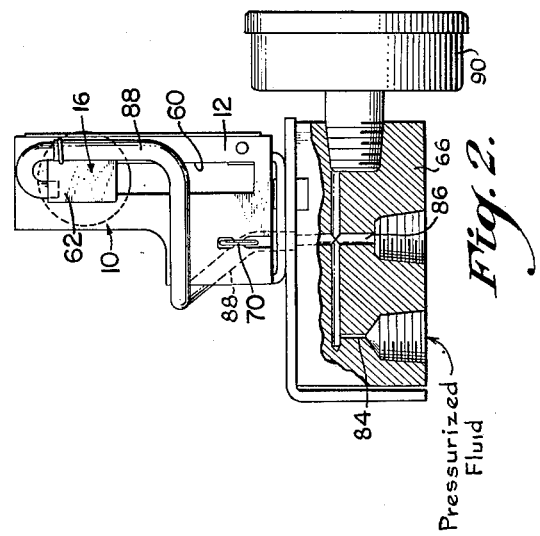
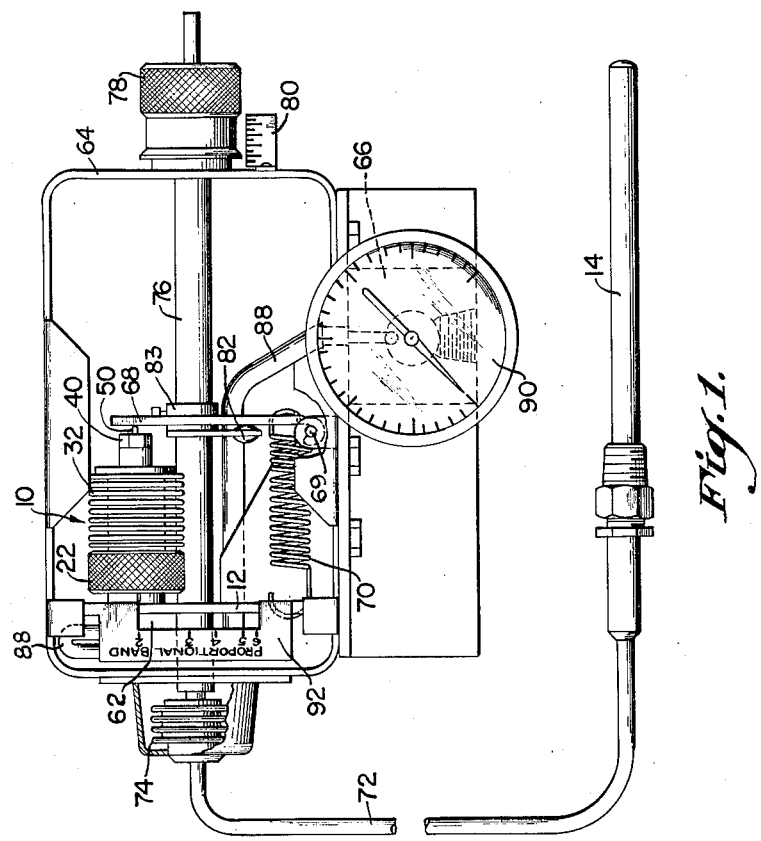

Sept. 25, 1962  L. M. PUSTER  3,055,384
PNEUMATIC CONTROLLER
Filed Sept. 3, 1959  2 Sheets-Sheet 2

3,055,384
PNEUMATIC CONTROLLER
Louis Medart Puster, Knoxville, Tenn., assignor to Robertshaw-Fulton Controls Company, Richmond, Va., a corporation of Delaware
Filed Sept. 3, 1959, Ser. No. 837,970
10 Claims. (Cl. 137—85)

This invention relates to pneumatic controllers and more particularly to controllers in which a mechanical input signal is used to deliver an output control pressure proportional to the input signal.

Many pneumatic controllers employ a flapper-nozzle arrangement in which a mechanical input signal moves the flapper towards the nozzle to restrict the flow therefrom with a resultant increase in the back pressure within a pneumatic system upstream from the nozzle. Such an arrangement might be considered a direct acting flapper-nozzle. This invention is concerned with a device which acts similarly to a reverse acting flapper-nozzle and contemplates, as one of its objects, reducing the back pressure within the pressurized fluid system in response to movement of a mechanical input signal towards the controller, and vice versa.

Another object of this invention is to allow the output control pressure to be adjusted, within limits.

A further object of this invention is to allow the proportional band to be adjusted.

Another object of this invention is to control the pressure within an expansible chamber to produce a control pressure proportional to the value of the input signal.

Other objects and advantages of this invention will be apparent from the following description taken in connection with the accompanying drawings wherein:

FIG. 1 is a front elevational view of a device embodying this invention;

FIG. 2 is an end elevational view, partly in section, with parts removed, of a portion of the device shown in FIG. 1;

Figure 3:
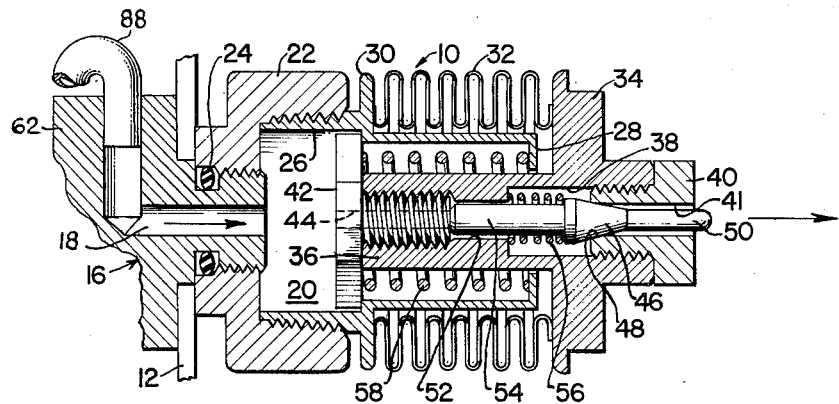
FIG. 3 is a longitudinal cross-sectional view, on an enlarged scale, of a feature of this invention.

Referring now to the drawings and more particularly to FIG. 1, a pneumatic controller is provided with a feedback bellows assembly indicated generally by reference numeral 10, adjustably mounted on a bracket 12 and actuated, in a manner described hereinafter, in response to changes in temperature of a temperature sensing bulb 14.

Figure 4:
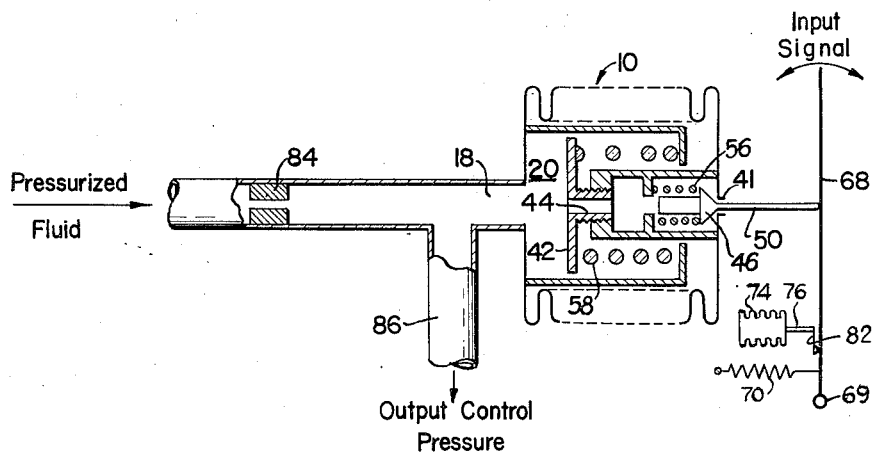
FIG. 4 is a somewhat schematic view for illustrating the operation of the feature shown in FIG. 3.

As best seen in FIGS. 3 and 4, assembly 10 comprises an inlet coupling 16 formed with an inlet passage 18 which communicates with an internal chamber 20. A somewhat cup-shaped knurled adjusting knob 22 is screwed onto coupling 16 and is provided with a counterbore which cooperates with an O-ring seal 24 to prevent fluid leakage. The side walls of knob 22 are internally threaded to receive the threaded end of a somewhat tubular member 26.

Tubular member 26 is formed at the other end with an inwardly extending annular flange 28. Also, tubular member 26 is provided with an outwardly extending annular flange 30 at a point intermediate to the ends thereof. An expansible-collapsible bellows 32 is hermetically sealed at one end to flange 30. The other end of bellows 32 is hermetically sealed to an end closure member 34. Bellows 32 is coaxial with and concentric to the portion of member 26 between flanges 28 and 30. The internal diameter of bellows 32 is larger than the external diameter of member 26 so that fluid pressure within chamber 20 acts upon bellows 32.

Member 34 is provided with an axially extending cylindrical body portion 36 formed with an axial bore 38 throughout the length thereof. Bore 38 is threaded at both ends. In one end, a valve seat member 40, which is in the form of a threaded plug having an outlet passage 41, is screwed. An adjusting screw 42 is screwed into the other end of bore 38 and is formed with an axial bore 44 (FIG. 4) through which fluid may flow from chamber 20 to outlet 41. The head of screw 42 is hexagonal and is formed with a diameter such that fluid pressure may act upon bellows 32 at all times.

A valve member 46, in the form of a tapered valve plug, cooperates with a valve seat 48 to form a valve means for controlling the flow of fluid from assembly 10 through outlet 41. Valve seat 48 is formed on valve seat member 40 on the inner end of the entrance to outlet 41. Valve member 46 is provided with a valve stem 50 which extends through and beyond the outer end of outlet 41 and is adapted to be actuated by a mechanical input signal, as described hereinafter.

Bore 38 is formed with a reduced diameter section 52 at a point intermediate to the ends thereof, which cooperates with a guide pin 54 to prevent valve member 46 from cocking within bore 38. Guide pin 54 is formed integral with valve member 46. A helical compression spring 56 is disposed coaxially with pin 54 in bore 38 and biases valve member 46 towards engagement with valve seat 48.

A helical compression spring 58 extends between the hexagonal head of screw 42 and flange 28 and biases closure member 34 in a direction which tends to compress bellows 32. Since bellows 32 is flexible, it is apparent that spring 58 produces a force on screw 42 which tends to move closure member 34 towards the left, as viewed in FIG. 1, against bellows 32 until the forces between spring 58 and bellows 32 are balanced.

Referring now to FIGS. 1 and 2, bracket 12 is mounted in an upstanding position and is provided with a vertical slot 60. Inlet coupling 16 is provided with a cubical block 62 (FIG. 2) at its left end which has a width greater than the width of slot 60. The inner end of coupling 16 is cylindrical and is formed with an outer diameter slightly less than the width of slot 60 so that when knob 22 is tightened, bracket 12 is compressed between the left end of knob 22 and the right face of block 62 to support controller 10 on bracket 12. Bracket 12 is stationary and is mounted within a cubical housing 64, which has its front plate removed and which in turn is mounted upon a base block 66. A lever 68 is pivotally mounted on a base portion of bracket 12 as by a pivot assembly 69 and is pivotally biased in a counterclockwise direction as viewed in FIG. 1 by a helical tension spring 70, so that the upper end of lever 68 is resiliently urged against valve stem 50.

Lever 68 is used to provide the mechanical input signal. It will be apparent to those skilled in the art that such a signal may be proportional to a change in pressure of, for example, a differential flow meter; however, by way of example only and for the purposes of illustration, lever 68 is actuated by temperature responsive means which includes temperature sensing bulb 14.

The temperature responsive means, in addition to bulb 14, comprises a capillary tube 72 connected at one end to bulb 14 and connected at the other end to a bellows assembly 74 which engages one end of a driven rod 76 slideably supported for axial movement in housing 64 in response to expansion and contraction of bellows assembly 74. Bellows assembly 74, tube 72 and bulb 14, are filled with a thermally responsive fluid and acts in a conventional manner to effect axial movement of rod 76 relative to housing 64 in proportion to changes in temperature of bulb 14. The other end of rod 76 terminates in a temperature set point means which includes a knurled adjusting knob 78. Rotation of knob 78 changes the bias of rod 76 acting on bellows assembly 74 and, in the usual manner, allows the set point temperature to be varied. A scale 80 may be provided for calibration purposes.

An actuating arm 82 is clamped upon rod 76 at a selected position axially of the rod as by a collar and set screw assembly 83. Arm 82 projects laterally from rod 76 to engage the left hand side of lever 68 as viewed in FIG. 1. Spring 70 thus acts to resiliently bias lever 68 against the outer end of arm 82 so that axial movement of rod 76 to the right as viewed in FIG. 1 pivots lever 68 in a clockwise direction about pivot assembly 69 while axial movement of rod 76 to the left as viewed in FIG. 1 results in counterclockwise pivotal movement of lever 68 because spring 70 resiliently biases lever 68 to follow movement of arm 82 to the left. Since the axial position of rod 76 relative to housing 64 is determined by the temperature sensed by bulb 14, the pivotal position of lever 68 about its pivot assembly 69 is likewise determined by the temperature sensed by bulb 14. The angular position of lever 68 is in turn employed to position valve 68 and valve stem 50 in a manner to be described in more detail below. Basically, controller 10 is operated in a fashion such that valve stem 50 is maintained in body engagement with the upper end of lever 68.

Inlet 18 of assembly 10 is adapted to be connected downstream from a restrictor orifice 84, which in turn is adapted to be connected to a source of pressurized fluid. At a point between orifice 84 and chamber 20, a branch conduit 86 is connected and is in communication with chamber 20 at all times. As will be apparent hereinafter, the branch conduit 86 taps off the back pressure within chamber 20 so as to provide an output control pressure which may be used to actuate a control means such as, for example, a pressure actuated valve. Restrictor 84 and conduit 86 may be suitably drilled in base block 66 to form passages which communicate with a flexible tube 88 which extends from the base block and is connected to coupling block 62. Block 62 is provided with suitable passage means so that the interior of tube 88 communicates with inlet 18. A pressure gauge 90 is preferably mounted upon base 66 and is connected to conduit 86 as by conduit 89 for the purpose of indicating the output control pressure.

It is preferable that the source of pressurized fluid be a pneumatic supply system which delivers clean dry air to the upstream side of orifice 84. In one embodiment of this invention, and by way of illustration only, when the pressure of the air delivered to restrictor orifice 84 is 20 p.s.i.g., the control output pressure at conduit 86 may be varied from 3 to 15 p.s.i.g. by adjustment of adjusting screw 42. The position of the components of assembly 10 shown in FIG. 3 are in a limiting position in that screw 42 is seated against the left end of cylinder 36 and against a shoulder portion of member 26, and it also engages guide stem 54 to hold valve member 46 against valve seat 48. Thus, for the assembly 10 to be operative, screw 42 has to be positioned as shown in FIG. 4, e.g., to the left of the position shown in FIG. 3, to allow limited movement. As with other similar types of controllers, the amount of actuating movement of valve stem 50 is in the order of a few hundredths of an inch so that the relative movement between valve seat 48 and valve member 46 is in the order of a few thousandths of an inch to effect the necessary modulation of the back pressure.

It should be noted that bracket 12 holds the left end of assembly 10 stationary so that the right end is freely movable in response to changes in pressure in chamber 20.

When valve stem 50 is moved inwardly against the bias of spring 56 to unseat valve member 46, fluid flows from outlet 16 and exhausts to the atmosphere. This flow is restricted, depending upon the relative position of valve member 46 and valve seat 48, to create a back pressure within chamber 29 which tends to extend bellows 32 longitudinally to the right. The stiffness of spring 56 is relatively small compared to the stiffness of spring 58 and bellows 32 so that the force tending to move valve member 46 is inoperable to affect the balance of forces in controller 10. Furthermore, the stiffness of spring 70 is sufficient to overcome the force of spring 56 through the lever ratio to insure the smooth opening and closing of valve member 46.

In operation, it may be assumed that fluid is flowing from outlet 41 and that assembly 10 is in a balanced condition wherein the position of valve seat 48 is proportioned to the pressure of chamber 20. A subsequent decrease in the temperature of bulb 14 causes rod 76 and actuating arm 82 to move to the left allowing lever 68 to rotate counterclockwise to provide a mechanical input signal which moves valve stem 50 inwardly. This increases the flow area between valve member 46 and valve seat 48 to cause a decrease in the flow resistance so that an increased amount of fluid will flow from outlet 41; however, this decrease in flow resistance also decreases the back pressure within chamber 20 so that bellows 32 will collapse slightly to move valve seat 48 towards valve member 46 to restrict the flow and increase the back pressure slightly. Similar movement continues until the forces are again balanced. When this occurs, the back pressure within chamber 20 has been changed in an amount proportional to the movement of lever 68. The back pressure within chamber 20 is also transmitted through conduit 86 to produce an output control pressure proportional to the position of lever 68 and the temperature of bulb 14.

On the other hand, if the movement of valve stem 50 from the balanced condition is outwardly in response to increases in temperature, the back pressure is increased thereby causing bellows 32 to expand until a new balance condition is reached. Again, when the balance condition is reached, the presssure within chamber 20 is proportional to the movement of valve stem 50. It will be obvious that when valve member 46 is open, the position and movement thereof is controlled by the input signal and the position of valve seat 48 is controlled by the back pressure within chamber 20. By moving assembly 10 vertically with respect to bracket 12, the lever ratio is changed causing a change in the proportional band. A scale 92 may be mounted in proximity to assembly 10 and suitably indexed to indicate the proportional band setting.

It will be apparent to those skilled in the art that many changes and modifications may be made in the details and arrangement of parts without departing from the scope of the invention as defined in the appended claims.

I claim:

1. A controller comprising: valve means including a valve seat and a valve member biased towards a closed position against said valve seat, said valve member being movable relative to said valve seat, a single expansible-collapsible means operably connected to position said valve seat proportional to the pressure within said expansible-collapsible means, said expansible-collapsible means being connected to a source of pressurized fluid, and actuating means operably connected to move said valve member and vary the pressure within said expansible-collapsible means.

2. A pneumatic controller comprising a first end wall having an inlet formed therein adapted to be connected downstream from an orifice supplied with a pressurized fluid, a second end wall movable relative to said first end wall and formed with an outlet which communicates with said inlet and through which fluid may flow, and a substantially tubular bellows operably connected to said end walls to move said second end wall relative to said first end wall in response to changes in pressure within said bellows, said second end wall including a cylindrical body disposed coaxially with and interiorly of said bellows and being formed with a central bore therethrough disposed substantially in alignment with said outlet, valve means disposed in said bore for controlling the flow of fluid through said outlet to vary the pressure within said bellows, said valve means including a valve seat formed adjacent the inner end of said central bore and being movable with said end wall a valve member movable toward and away from said valve seat means resiliently biasing said valve head towards a closed position against said valve seat, and spring means located within said bellows resiliently biasing said second end wall in a direction tending to collapse said bellows.

3. In a controller; a valve assembly comprising a valve body having a flow passage therethrough terminating at one end at a valve seat, a valve head movable relative to said valve body toward and away from said valve seat for controlling the flow of fluid through said passage, a bellows having an internal chamber, means connecting said chamber to a source of fluid under pressure, opposed ends on said bellows movable toward and away from each other in proportional response to the pressure of pressure fluid within said chamber, means mounting said valve body on one of said opposed ends of said bellows for movement therewith to define an outlet from said chamber, means on said mounting means supporting said valve head for flow controlling movement toward and away from said valve seat in a direction parallel to the direction of movement of said opposed ends relative to each other, means on said mounting means biasing said valve head toward a closed position against said valve seat, and actuating means for adjustably locating said valve head with respect to the other of said opposed ends of said bellows to vary the pressure of fluid within said chamber.

4. A controller comprising valve means including a valve seat and a valve head biased toward a closed position against said valve seat, said valve head being movable toward and away from said valve seat, a bellows having an internal chamber, means for connecting said chamber to a source of fluid under pressure, said bellows having a stationary end and a movable end movable toward and away from said stationary end in proportional response to variations in the pressure of a pressure fluid in said chamber, means mounting said valve means on said movable end of said bellows with said valve seat fixed against movement relative to said movable end and said valve means defining a valve controlled outlet for releasing fluid under pressure from said chamber, said mounting means locating said valve means on said movable end with the direction of movement of said valve head toward and away from said valve seat extending parallel to the direction of movement of said movable end toward and away from said stationary end, and actuating means for shifting said valve head toward and away from said valve seat to regulate the pressure of pressure fluid within said chamber.

5. A controller comprising a frame, a bellows having an internal chamber and a stationary end mounted on said frame, means for connecting said chamber to a source of fluid under pressure, said bellows having a movable end movable along a predetermined path toward and away from said stationary end in proportional response to variations in the pressure of pressure fluid within said chamber, adjustable valve controlled chamber outlet means including a valve head and a valve seat movable relative to each other, said valve head and said valve seat being mounted upon and movable with said movable end of said bellows for releasing fluid under pressure from said chamber at a rate determined by the position of said valve head relative to said valve seat and the pressure of fluid within said chamber, condition responsive control means including an actuating member mounted on said frame for movement relative to said frame in proportional response to variations in a control condition, and means coupling said actuating member to said valve head for varying the relationship between said valve head and said valve seat in accordance with variations in said control condition.

6. A controller comprising a frame, a bellows having an internal chamber, means for connecting said chamber to a source of fluid under pressure, means securing one end of said bellows to said frame, the other end of said bellows being movable along a predetermined path toward and away from said one end in proportional response to variations in the pressure of pressure fluid within said chamber, adjustable valve controlled chamber outlet means including a valve head and a valve seat movable relative to each other, said valve head and said valve seat being mounted upon and movable with said movable end of said bellows and being operable to release fluid under pressure from said chamber at a controlled rate determined by the relationship of said valve head to said valve seat, a control member mounted upon said frame for movement along a fixed path toward and away from said one end of said bellows, means coupling said control member to said valve head to vary the relationship between said valve head and said valve seat upon movement of said control member relative to said frame, first means for varying the proportional response of the movement of said movable end of said bellows to variations in pressure within said bellows, and second means for adjusting said coupling means to vary the amount of motion transmitted by said coupling means from said control member to said valve head.

7. A controller as defined in claim 6 wherein said coupling means comprises a lever pivotally mounted on one end upon said frame, condition responsive means coupled to said lever at an intermediate location for swinging said lever in pivotal movement in response to variations in a control condition, said lever being engageable at a point spaced from said intermediate location with said valve head whereby pivotal movement of said lever varies the relationship between said valve head and said valve seat, said second means comprising means on said mounting means for shifting said bellows relative to said frame to thereby shift the point of engagement between said valve head and said lever toward or away from said intermediate location on said lever.

8. A controller comprising pressure responsive means having a pressure chamber and a movable member movable in either direction along a given path in proportional response to variations in pressure within said pressure chamber, a source of fluid under pressure, a supply conduit connecting said source to said chamber, a flow restricting orifice in said supply conduit between said source and said chamber, an output control conduit connected to said supply conduit between said orifice and said chamber whereby the pressure in said output conduit is regulated by the pressure within said chamber, means in said movable member defining an outlet passage for releasing fluid under pressure from said chamber, a valve seat in said passage, a valve head mounted on said movable member for movement toward and away from said valve seat to control the rate of flow of fluid through said passage, a valve actuating member movable in either direction along an actuating path parallel to said given path and coupled to said valve head to move said valve head away from said valve seat to increase the rate of flow of fluid through said passage when said actuating member is moved in one direction, means biasing said valve head toward said valve seat to decrease the rate of flow of fluid through said passage upon movement of said actuating member in the direction opposite said one direction, and control condition responsive means for moving said actuating member in proportional response to variations in a control condition.

9. A controller as defined in claim 8 further comprising first means for varying the proportional response of said movable member to variations in pressures within said pressure chamber, and second means for varying the proportional response of said actuating member to variations in said control condition.

10. A controller as defined in claim 8 wherein said pressure responsive means comprises a bellows having an internal chamber constituting said pressure chamber and having a pair of opposed ends, a frame, means coupling one end of said bellows to said frame to thereby constitute the other end of said bellows as said movable member, said means coupling said one end of said bellows to said frame being adjustable to vary the position of said one end of said bellows on said frame relative to said actuating member.

References Cited in the file of this patent

UNITED STATES PATENTS

| | | |
|---|---|---|
| 2,556,436 | Moore | June 12, 1951 |
| 2,780,230 | Freeman | Feb. 5, 1957 |